Patented Aug. 3, 1948

2,446,273

UNITED STATES PATENT OFFICE 2,446,273

PURIFICATION OF SLUDGE ACID AND ACTIVATION OF CLAYS

Wright W. Gary, Los Angeles, Calif., assignor to Filtrol Corporation, Los Angeles, Calif., a corporation of Delaware No Drawing. Application November 9, 1943, Serial No. 509,632

2 Claims. (Cl. 252—301)

1

Sulfuric acid is employed in petroleum technology in various ways, and the end product of its utilization is usually a sludge composed of unreacted sulfuric acid, petroleum sulfonates, including the sulfonic and sulfinic acids of the hydrocarbons present in the petroleum to be treated, and also sulfuric esters of complex character together with dissolved hydrocarbons usually of olefinic character. Such material is termed acid sludge.

Such sludges are produced when acid is employed as a treating agent for light hydrocarbons such as gasolne and kerosene and also when employed in the purification of lubricating oils and in the production of so-called medicinal white oils. A new source of acid sludges arises from the use of sulfuric acid as a polymerizing agent and as an alkylating agent.

In the alkylation process the acid of about 98% strength is contacted with iso-paraffins, such as iso-butene, and with unsaturated hydrocarbons, such as butenes. As a result of this operation the iso-paraffin alkylates the unsaturated hydrocarbon. The acid becomes fouled, it is believed by workers in this art, due to the dehydrogenating effect of the sulfuric acid on olefins. The result, it is believed, is the formation of highly unsaturated hydrocarbons soluble in the sulfuric acid. The concentration of the acid thus decreases during use, due to dilution by these organic compounds in the acid. The acid is usually discarded when it reaches a concentration of 85% to 90%, more or less.

In the polymerization process the olefinic hydrocarbons, such as butene and isobutene, are mixed with sulfuric acid at relatively low temperature and the acid hydrocarbon complex heated to an elevated temperature. The hydrocarbons become polymerized. The acid becomes spent after a number of cycles of re-use.

It is well known that unsaturated and other organic bodies may be separated from such acid sludges on dilution with water. The oily fractions so separated are termed acid oils. The diluted acid is still contaminated by polymerized bodies, carbon, and other organic impurities. The dilution with water separates dissolved organic bodies whose solubility in dilute sulfuric acid is low. Oils are separated out by hydrolysis of the sulfuric, sulfonic, and sulfinic esters. The elevated temperatures obtained on dilution accelerates the dehydrating, carbonizing, and polymerizing effect of the acid on the organic matter of the sludge acid.

The utilization and purification of such acids present a substantial problem. I have discovered that I may employ such acids in the acid treatment of clay, particularly in the production of catalysts to be employed in catalytic conversion

2 of hydrocarbons, by acid treatment of a subbentonite clay of the montmorillonite group.

In the process of my invention sludge acids, produced by action of water on the sludge, may be purified by treatment with clay, and the purified acid employed in producing acid treated clay.

In employing the carbonaceous sludge acid in my process the resulting acid treated clay contains the carbonaceous impurities of the acid. These impurities are removed by calcining the clay in an oxidizing atmosphere such as is employed in the regeneration stage of a catalytic cracking operation.

In the process of my invention active clays of high adsorption and catalytic properties may be obtained by diluting the acid sludge and then, with or without separation of the acid oils and tars, contacting the diluted sludge with sub-bentonite clay at a relatively high temperature around 200° or 215° F. for the period of time necessary to cause the desired extraction of alumina, and then washing and filtering the clay. The clay thus produced will be contaminated with a considerable amount of organic matter composed of tars resulting from the extensive polymerization of the hydrocarbons and sulfuric acid reaction products present in the sludge. I may then pellet the clay by any appropriate procedure such as extrusion through dies in an extrusion press. The tar products present in the clay assist the pelleting operation by acting as a supplementary binder. I may then subject the pellets to combustion with air at a temperature of about 1000° F. to 1100° F. in a Herreshoff or Wedge furnace or in a regeneration unit such as used in regenerating catalysts employed in catalytic cracking. The combustion of the organic matter is controlled by controlling the concentration of oxygen, diluting the air with fuel gas if necessary. The combustion of the tars and coke increases the porosity of the clay pellet.

The following examples illustrate my process and are intended not as a limitation but as an exemplification of my invention. While the examples given relate to the use of alkylation sludge acid, the process illustrated may be applied to the acid sludges obtained in the acid treatment of gasoline, kerosene, or lubricating oil cuts or resulting from use in a polymerization operation as described above.

The spent alkylation acid discarded from a sulfuric acid alkylation unit will usually contain about 85% to 90% of $H_2SO_4$ and from 10 to 15%, more or less, of water and dissolved organic matter. This acid may also contain free carbon. This acid is mixed with water in an amount sufficient to give a separated acid of about 60% acidity. The temperature rises from about 260° F. to 270° F.

Acid oil separates from the diluted acid and the phases are separated. The diluted acid will carry about 1% to 2% of carbon and carbonaceous material. The acid-water phase is best termed "sludge acid."

I may employ these sludge acids for the treatment of sub-bentonite clays of the montmorillonite class such as have been in the past activated by acid treatment. An example of such clay is anhydrous clay of the following analysis:

|  | Per cent |
|---|---|
| Silica ($SiO_2$) | 67.3 |
| Titanium oxide ($TiO_2$) | 0.3 |
| Aluminum oxide ($Al_2O_3$) | 19.5 |
| Ferric oxide ($Fe_2O_3$) | 1.8 |
| Manganese oxide (MnO) | 0.8 |
| Magnesium oxide (MgO) | 6.9 |
| Calcium oxide (CaO) | 3.2 |
|  | 99.8 |

I may employ the acid in dilution of from 10 to 60%, preferably about 10 to 20%, and mix the acid in such dilution with clay. The amount of acid used, calculated as anhydrous $H_2SO_4$ free, may vary from 20 to 250% of the clay used, calculated as volatile free. As an example, I may employ from 30% to 50%. The clay and the acid is reacted at about 210 to 215° F. The duration of treatment is such as to extract a portion of the clay by reaction with the acid to reduce the clay to about 10 to 20% of $R_2O_3$, (that is, the sum of $Al_2O_3$ and $Fe_2O_3$), mainly $Al_2O_3$ with from about 1 to 2% $Fe_2O_3$, for example 17% $R_2O_3$ of which 15.5% is $Al_2O_3$ and 1.5% is $Fe_2O_3$.

The clay is then separated from the acid and washed substantially free of acid and dried and ground. Such clay will be an active decolorizing and catalytic clay.

The clay will be contaminated with carbonaceous material and polymerized tar, and other organic material present in the sludge.

Such clay may be further purified by heating to a temperature of about 1000° to 1100° F. and exposing the hot clay to oxygen containing gas. For example, the clay may be fed into the regenerator of a fluid type catalyst unit where it is mixed with the clay undergoing regeneration and the carbonaceous material is burned out.

I may specially treat the clay in a Herreshoff or Wedge furnace such as has been used for the regeneration of spent contact clay employed in the purification of lubricating oil. The hot clay is contacted with oxygen containing gas and the carbonaceous impurities are burned out.

Another procedure is to pellet the clay. The dry clay, usually about 20 to 30% moisture, is mixed with water sufficient to give a pelleting mix of say 40 to 45% and extruded from to form cylindrical pellets, for example, $\frac{1}{16}$ of an inch in diameter and $\frac{1}{8}$ of an inch long. The pellets are dried carefully to reduce the moisture content to about 15 to 20%. The pellets are hard. The carbonaceous material acts as a binder. The carbonaceous material in the pellets may be burned out by calcining the pellets at a temperature of about 1000° F. in an oxidizing atmosphere. The removal of this material adds to the porosity and the activity of the catalyst material.

This may be accomplished by adding the pellets to the stream of spent catalyst moving from a moving bed catalyst reaction chamber to a moving bed catalyst regenerating unit. These pellets are mixed and exposed to combustion regeneration in the regenerator of the unit. They may thus constitute the make-up which is added to make up for losses of catalytic pellets in such an operation.

The pellets may, of course, be separately treated either in a moving bed type of apparatus or a Herreshoff or Wedge furnace. In such operation the pellets are treated and contacted at a temperature of about 700° to 1000° F. with an oxygen containing gas, such as air or air-fuel gas mixture. The pellets of any such procedure are purified by the burning of the carbonaceous material.

Instead of employing the sludge acid as produced by the treatment action previously described, I may further purify the acid before using the acid. Such acids may be thus produced in purity substantially equal to the purity of commercial sulfuric acid.

I have found that if acid sludge produced in the acid treatment of petroleum fractions, or produced in the sulfuric acid polymerization of unsaturated gases, or in the alkylation of isoparaffins by unsaturated gases, is diluted and the liberated acid-oil separated from the diluted acid, the residual sludge acid may be produced in adequate purity by contacting the diluted acid with a native, untreated sub-bentonite clay or with an adsorbent clay such as previously acid treated clay. The acid thus produced is of such purity as to be useful in the production of the acid treated montmorillonite clays.

An acid sludge produced in polymerization or alkylation and employed in the following example was a viscous liquid having a strong odor and an acid content of 84.3, the remaining 15.7 was composed of some water and organic matter. The sludge was heated to a high temperature to carbonize and coagulate the organic matter. Considerable separation of organic matter was obtained. The sludge was fortified with fuming acid to further carbonize the organic matter and the carbonized matter was settled and the purified acid decanted. Substantial separation of the organic matter was thus obtained. The sludge was boiled to coagulate the organic matter, thus producing a viscous mass of organic matter. The viscous mass was leached for the removal of dilute acid. The acid thus produced was adjusted to a concentration of about 15% and employed for the acid treatment of clay as previously described.

The acid may be produced in greater purity for the purposes of my process by contacting said acid with clay. The diluted, recovered acid obtained by the above described procedures was diluted to a concentration of about 30% to 40% $H_2SO_4$. The diluted acid of about 40% strength was treated with clay such as native, sub-bentonite, montmorillonite clays such as used in the production of acid treated, decolorizing and catalytic clay. This contacting was carried out at ordinary room temperatures and the acid and clay separated substantially immediately, that is, no reaction time was provided above that necessary to produce the contacting and separating operation. The clay was thus subjected to minor and inconsiderable reaction with the acid. For example, the acid of 40% strength was percolated through a column of raw sub-bentonite clay such as employing a ratio of 14 pounds of clay per 100 pounds of filtrate produced. The filtrate produced had an acid strength of about 38%. Thus substantially no consumption of acid by clay was experienced. Instead of employing the percolating-contacting method I may employ the contact filtration method in which the clay is mixed with the diluted acid and then separated by filtration.

The above filtrate was employed in the activation of the sub-bentonite clay, for example, clay whose analysis is given above. The acid concentration in the mixture of clay and acid was 8%, calculated upon the total water content of the clay-acid mixture. The amount of acid employed was 35% of $H_2SO_4$ (calculated as anhydrous), based upon the clay (calculated as volatile free). The resultant clay will be of a composition similar to that given above for treated clay, to wit, 10 to 20% $R_2O_3$, for example, 17% $R_2O_3$, composed of about 15% $Al_2O_3$ and 1 to 2% $Fe_2O_3$. The acid consumption of such extraction will be from 50 to 75% of the acid consumed by reaction with the clay. The clay produced by activation was white in color, showing no contamination by organic matter and had a catalytic and oil decolorizing activity comparable to that produced employing commercial grade sulfuric acid.

The concentration, reaction time, and amount of acid here given are illustrative only. I may employ the acid in any concentration and amount and for any time where it is necessary to obtain the degree of extraction desired.

Instead of employing percolation through or contacting with raw clay, I may purify the diluted sludge acid, contaminated by carbonaceous impurities, by contacting the acid treated clay, either by percolation or by contact filtration. I may use for such pretreatment and acid purification an acid activated clay produced by contacting the purified sludge acid with native clay as described above. I may employ an acid activated clay, commercially produced by activation, with diluted commercial sulfuric acid. Thus the sludge acid may be mixed with acid treated clay having a high decolorizing activity such as described above in an amount of 3.7 grams of clay (containing 20% volatile matter) per 100 grams of filtrate produced. After the mixture was made, it was immediately filtered without allowing any substantial reaction time. The filtrate produced had an acid strength of 35.3% $H_2SO_4$, substantially free of carbonaceous impurities. The yield of acid was 96.8% of the charge showing that substantially none of the acid was consumed by reaction with the clay. The resultant clay will be contaminated with the carbonaceous impurities of the sludge acid.

The resultant acid was employed in activating clay in the manner described under previous examples wherein from 25% to 75% of the acid is consumed in the activation of the clay, producing clays having activity comparable to that produced in ordinary commercial treatment employing diluted commercial sulfuric acid. The clay produced had only a slight brownish tint, showing substantially no contamination by organic matter. This clay may be used for the above purification to produce a countercurrent acid process of purification and clay activation.

The clay employed in the purification stage will contain the carbonaceous impurities removed from the sludge acid. This clay may be treated as described above either in its granular form or in its pellet form to burn off the impurities as described above.

The resultant acid activated clay is one of high catalytic and adsorbent activity.

The color of the clay produced by treating with reclaimed acid, as described above, may be improved if the acid filtrate, before it is employed for activation of clay, is aerated by bubbling air through the filtrate. When this blown acid solution is employed in activation as described above, the results obtained are substantially similar to that of the unblown filtrate, giving clays having substantially the same efficiency. The color of the clay, however, is improved, being almost white.

While I have described a particular embodiment of my invention for the purpose of illustration, it should be understood that various modifications and adaptations thereof may be made within the spirit of the invention as set forth in the appended claims.

I claim as my invention:

1. A process for producing acid activated clay and purified sludge acid, which comprises contacting a sub-bentonite clay with purified sludge acid to extract a material proportion of the alumina of said clay and to consume a substantial proportion of the acid in said activation and to produce an acid activated clay, separating said acid activated clay from the sludge acid, diluting with water an acid sludge produced by the treatment of hydrocarbons with sulfuric acid, separating a sludge acid from said diluted acid sludge, which sludge acid is contaminated by carbonaceous impurities, contacting said sludge acid with the above named acid activated clay for a time insufficient to cause any material consumption of said sludge acid, and separating the sludge acid substantially free of carbonaceous impurities from the acid activated clay containing said impurities and employing said sludge acid to extract additional sub-bentonite.

2. A process for producing acid activated clay and purified sludge acid, which comprises contacting a sub-bentonite clay with purified sludge acid to extract a material proportion of the alumina of said clay and to consume a substantial proportion of the acid in said activation and to produce an acid activated clay, separating said acid activated clay from the sludge acid, diluting with water an acid sludge produced by the treatment of hydrocarbons with sulfuric acid, separating a sludge acid from said diluted acid sludge, which sludge acid is contaminated by carbonaceous impurities, contacting said sludge acid with the above named acid activated clay for a time insufficient to cause any material consumption of said sludge acid, separating the sludge acid substantially free of carbonaceous impurities from the acid activated clay containing said impurities, and heating said clay in an oxidizing atmosphere to burn off said carbonaceous impurities and employing said purified sludge acid to extract additional sub-bentonite clay.

WRIGHT W. GARY.

REFERENCES CITED

The following references are of record in the file of this patent:

UNITED STATES PATENTS

| Number | Name | Date |
|---|---|---|
| 1,953,144 | Wilson | Apr. 3, 1934 |
| 1,960,348 | Pongratz | May 29, 1934 |
| 2,018,987 | Wirzmuller | Oct. 29, 1935 |
| 2,044,341 | Wollner | June 16, 1936 |
| 2,066,685 | Hechenbleikner | Jan. 5, 1937 |
| 2,139,026 | Matheson | Dec. 6, 1938 |
| 2,222,400 | Butz | Nov. 19, 1940 |